(12) United States Patent
Syfritt

(10) Patent No.: US 6,619,224 B1
(45) Date of Patent: Sep. 16, 2003

(54) MARINE VESSEL

(76) Inventor: Harold A. Syfritt, 2003 S. Mesa, San Pedro, CA (US) 90731-5515

( * ) Notice: Subject to any disclaimer, the term of this patent is extended or adjusted under 35 U.S.C. 154(b) by 0 days.

(21) Appl. No.: 10/154,473

(22) Filed: May 24, 2002

(51) Int. Cl.$^7$ ................................................. B63B 7/04
(52) U.S. Cl. ........................ 114/352; 114/345; 114/355; 114/284; 114/285; 441/40
(58) Field of Search ................................. 114/284, 285, 114/352–355, 359, 345; 441/40

(56) References Cited

U.S. PATENT DOCUMENTS

| | | | | |
|---|---|---|---|---|
| 3,559,222 A | * | 2/1971 | Walker ........................ | 114/357 |
| 3,846,858 A | * | 11/1974 | Syfritt ........................ | 114/354 |
| 4,438,343 A | * | 3/1984 | Marken ....................... | 290/53 |
| 4,494,477 A | * | 1/1985 | Matthews .................... | 114/287 |
| 4,966,254 A | * | 10/1990 | Nakano ....................... | 185/30 |
| 6,003,465 A | * | 12/1999 | Khachatrian et al. ....... | 114/271 |

* cited by examiner

Primary Examiner—Jesus D. Sotelo

(74) Attorney, Agent, or Firm—Neil F. Markva

(57) ABSTRACT

A modular marine vessel has a variable hull and a plurality of boat forming modules including a bow section module, a load section module having a bow end and an aft end, and a bulkhead forming module is detachably connected to each bow and aft end of the load section module. The bulkhead forming module that is connected at the bow end of the load section module is detachably connected to the bow section module. Each boat forming and bulkhead forming module includes a topside section and a hull bottom side section. The topside section of each boat forming module has a shell gunnel portion, and the hull bottom side section of each boat forming module has a pivotally mounted bottom shell hull portion. The gunnel and hull portions of the load and bow section modules are detachably connected end-to-end, and sealingly juxtaposed the detachably connected bulkhead forming module to prevent water from entering the boat when the boat engages water. The bottom shell hull portion is pivotally mounted across a keel tunnel using a pneumatic, hydraulic, mechanical, or electro-mechanical actuator to form a preselected hull shape as desired. Novel mechanisms for sealing module connections, for module attachment, for pivoting hull panels, for hull pivot drives, and energy conversion systems for the marine vessel of the invention are disclosed.

26 Claims, 11 Drawing Sheets

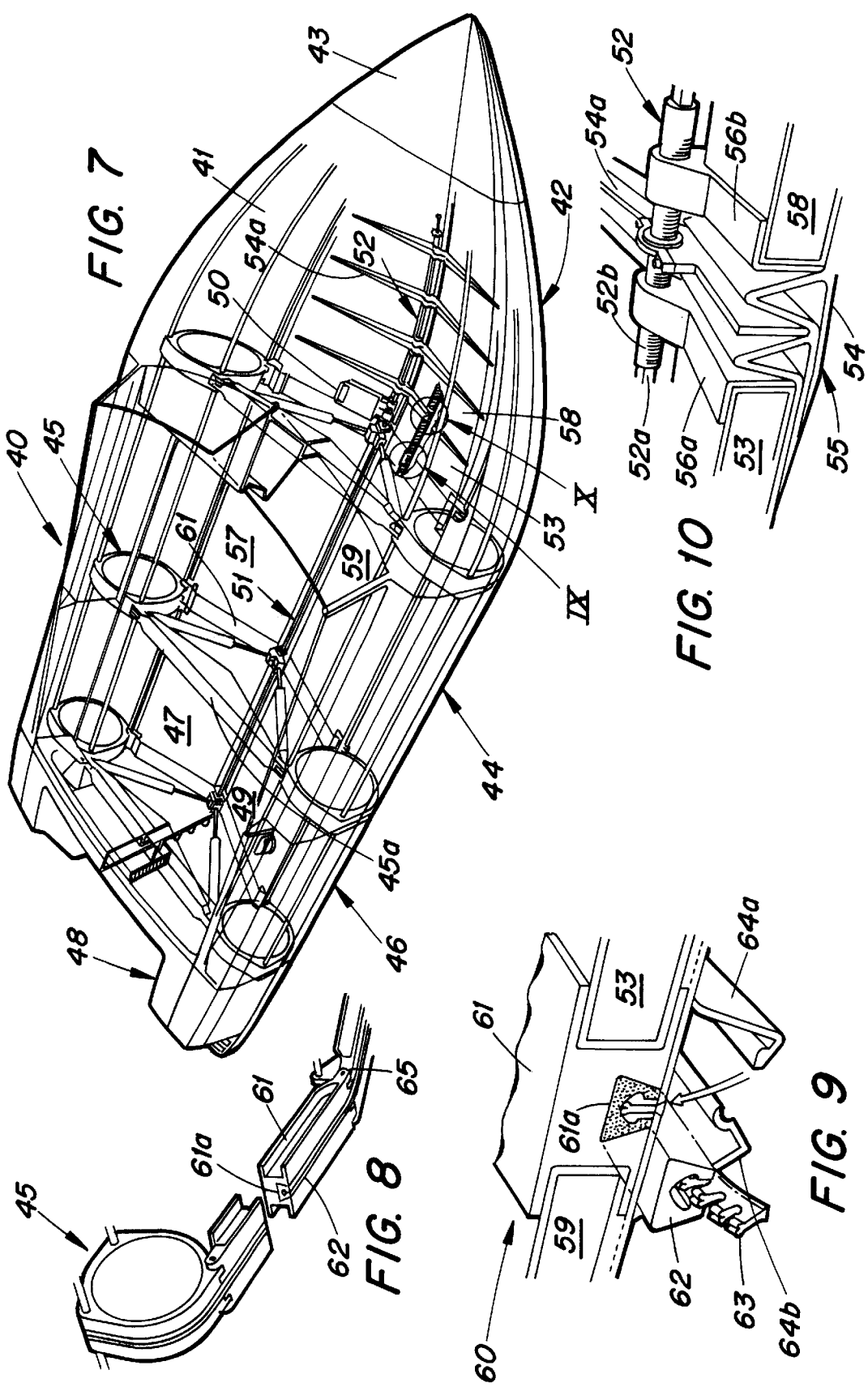

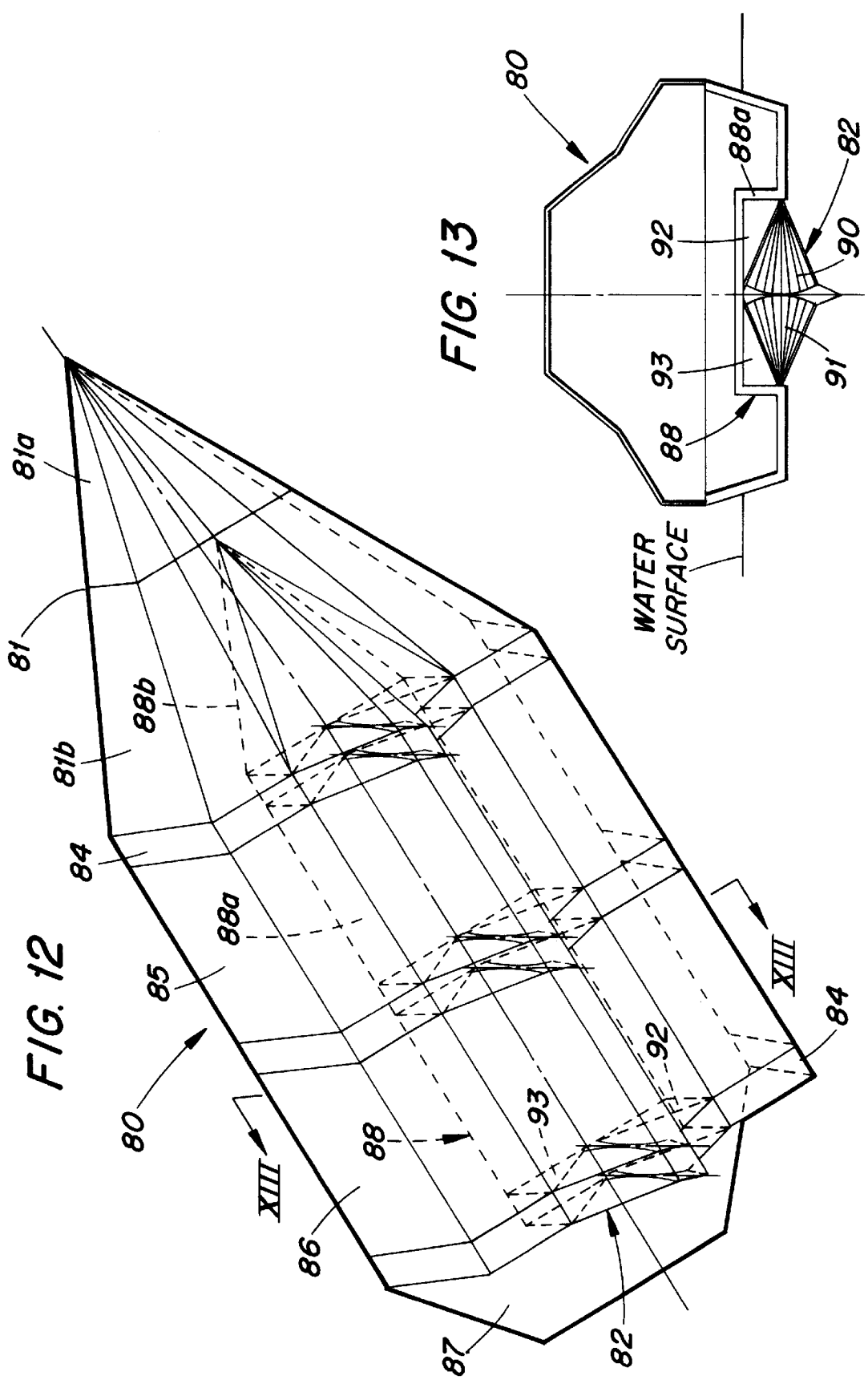

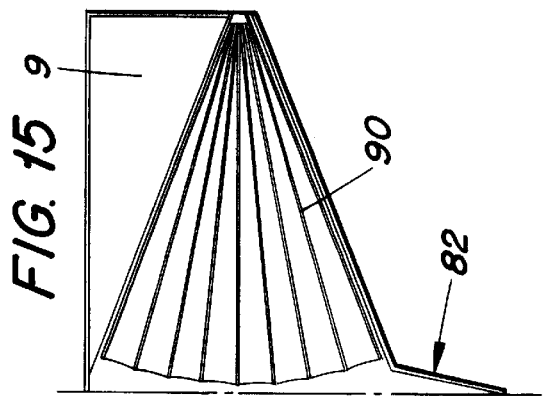
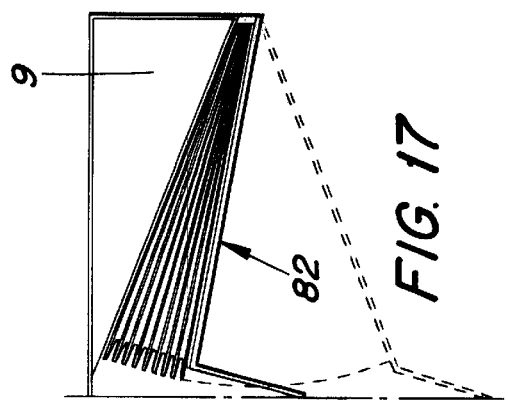
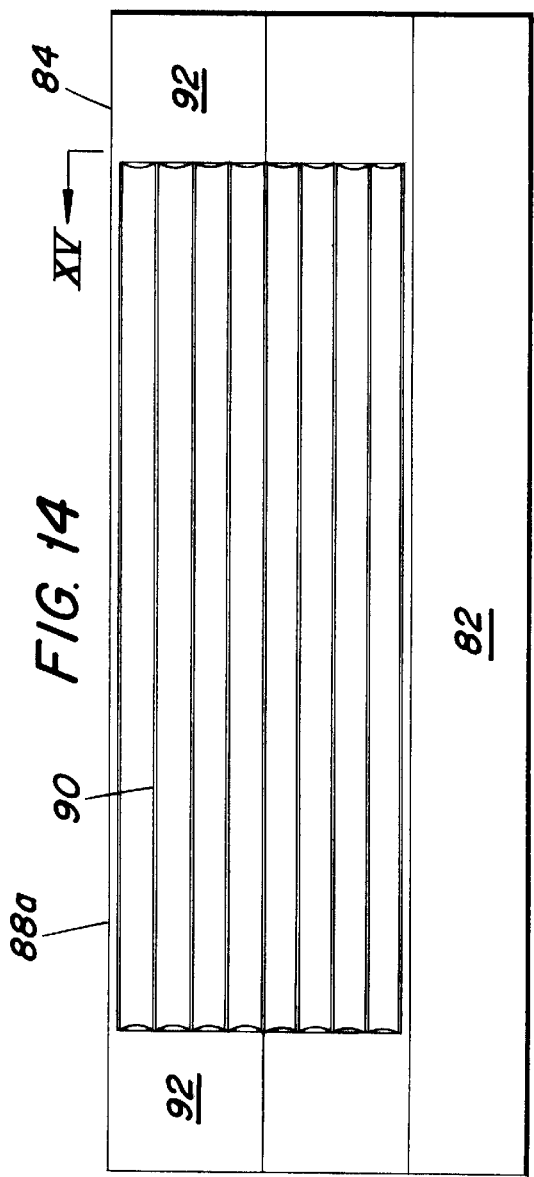
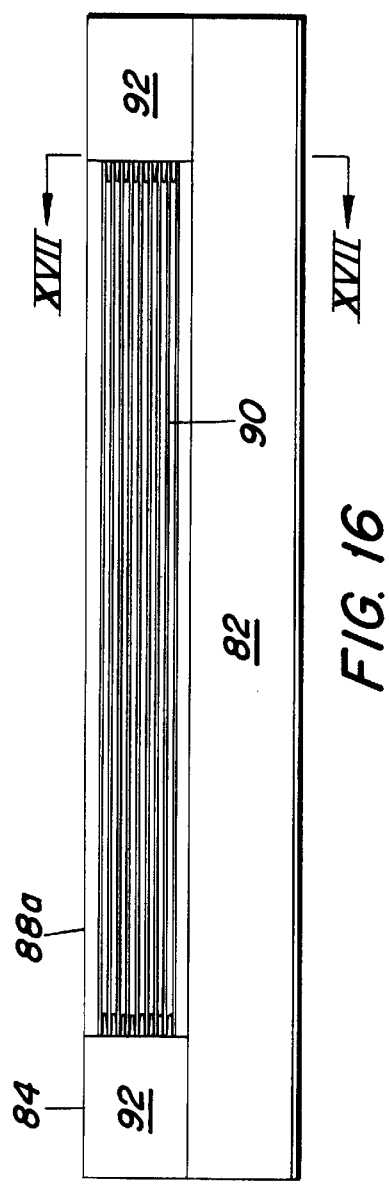

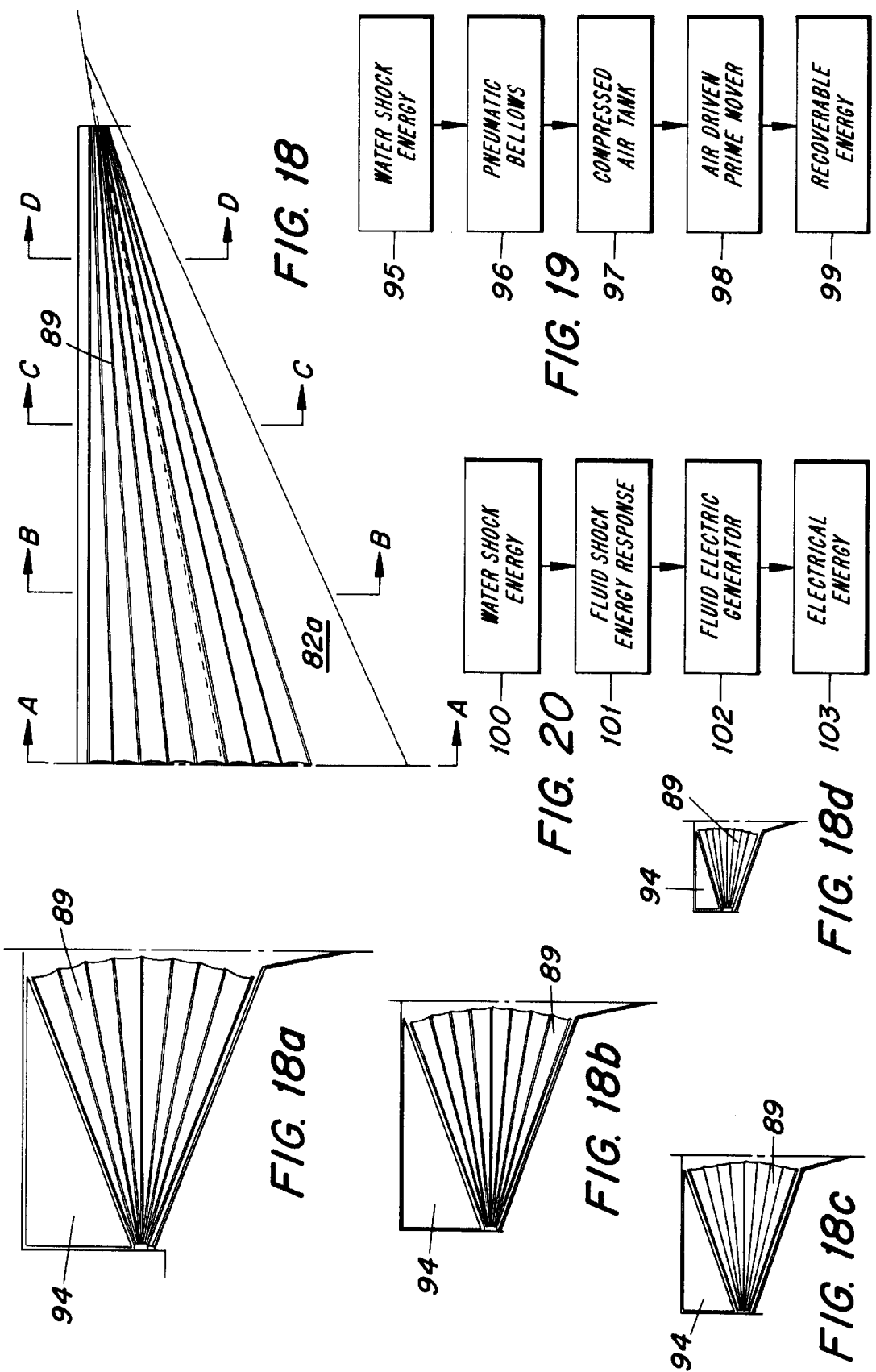

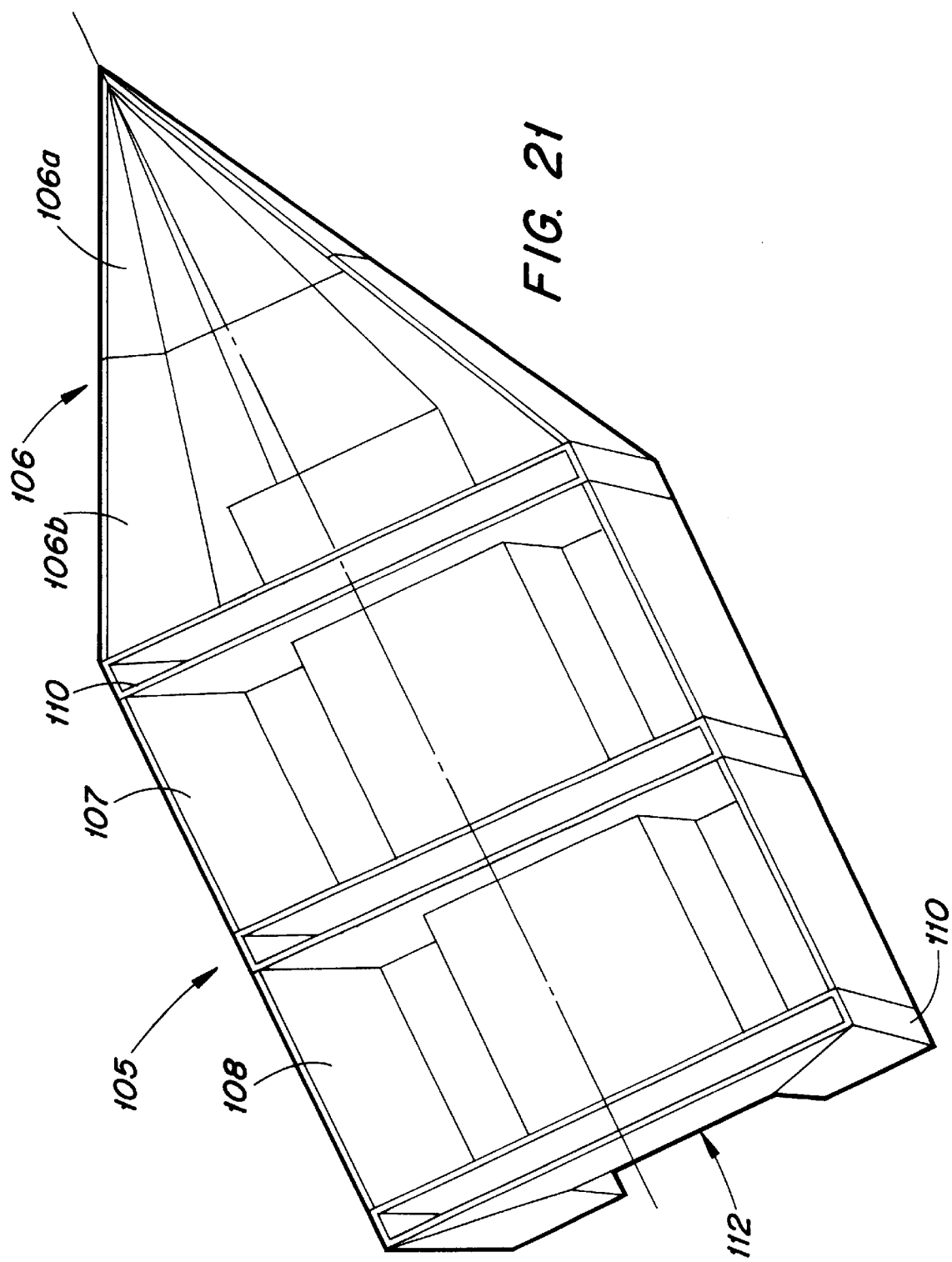

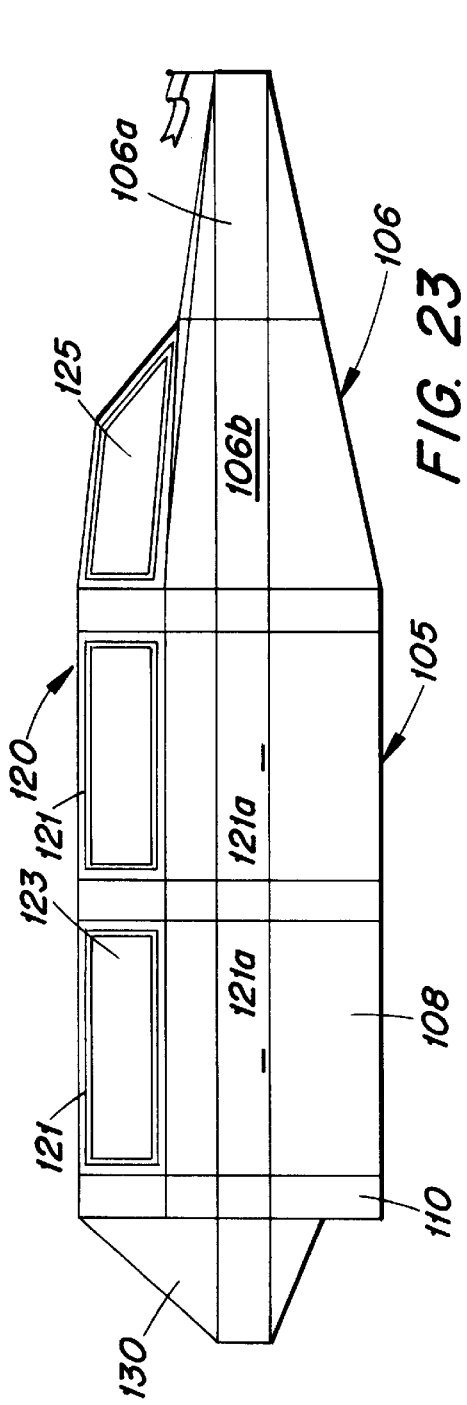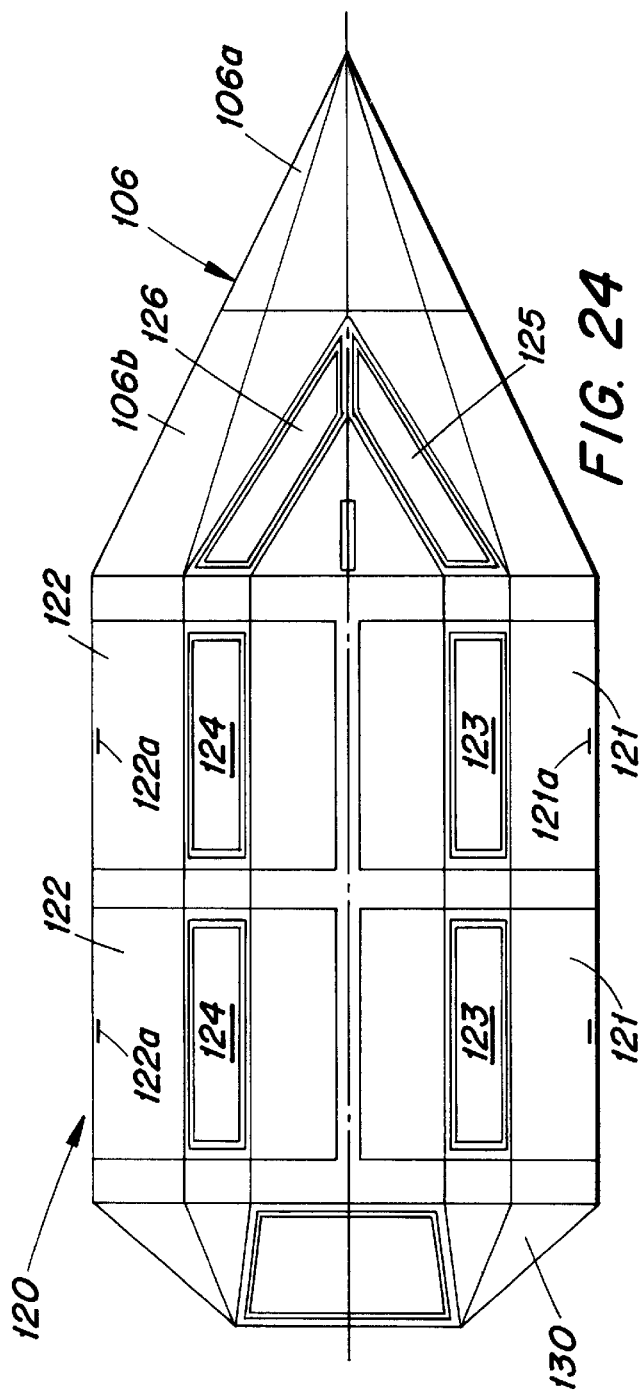

MARINE VESSEL

FIELD OF THE INVENTION

This invention relates to recreational boats having variable hull configurations and/or a modular construction system. Particularly, the invention relates to a marine vessel composed of a multiple of modular sections that may be assembled by the consumer who may then convert the hull of the boat as desired to a selected shape to move through water in various conditions, and to enjoy the benefit of varied uses of the water craft.

BACKGROUND OF THE INVENTION

This invention is an improvement on the recreational vessels of U.S. Pat. Nos. 3,846,858 and 3,930,274 comprising convertible assemblies which provide a variety of experiences to the water enthusiast along with enhancing the convenience and safety of the boating public and to those who desire their use on land and ice. All of the advantages of the assemblies of these earlier patents are attendant this invention.

Water craft having a system of converting the hull shape into various configurations are known. Such a craft allows its owner to choose any boat hull configuration from a number of different shapes such as a deep V-shaped power boat, a double-hulled catamaran, a day sail boat, or a shallow draft bass fishing boat. The deep V-shaped hull is ideal for stability in rough water and cutting through large waves such as encountered when deep sea fishing and ocean cruising. A shallow V-shaped hull may be used in less severe conditions; a flat bottomed boat is useful on a still lake or shallow pond; and a multi-hulled catamaran may be used for speed and fuel economy.

U.S. Pat. No. 3,076,204 is directed to power boat assemblies having a hull defined by flexible membranes that define air compartments that are beneath the plane of the boat deck and pneumatically pressurized. This hull structure addresses the problem of handling severe stresses that are imposed by the pounding action of waves through which the boat travels.

U.S. Pat. No. 3,559,222 discloses a boat with an adjustable bottom that is pneumatically changed into any one of a number of different hull configurations. A solid panel structure responds to the condition of the water in which the boat is situated, and a mechanism is capable of actuating an adjusting structure to automatically change the hull configuration to the particular conditions under which the boat is operated. An inflatable, fluid-tight bag that receives air under pressure when actuated or a bellows may be used to move a bottom wall having a plurality of pivotally connected sections to the desired shape. In other embodiments, a mechanical structure is used to move the sectional bottom wall to the desired hull configuration.

Each U.S. Pat. Nos. 3,190,587 and 3,413,948 discloses a pair of inflatable bellows or chamber devices that extend along the length of a fixed boat hull so as to controllably adjust the outer hull surface to an inflated shape on both sides of the boat.

U.S. Pat. Nos. 2,265,206; 2,349,584; 3,496,899; 4,494,477; 4,535,712; and 6,003,465 disclose various pneumatically controlled hull configurations on flying and water surface-bound boats that adapt to varied water surface conditions.

U.S. Pat. No. 3,288,236 is directed to a hydro-air cushion vessel having a shock absorbing mechanism for absorbing the impact of waves and debris on the boat hull surface.

U.S. Pat. No. 3,981,260 discloses a surface effect-type ship having a shock receiving cavity fitted with an air bag that is positioned in the cavity to cushion a pivotally mounted keel member for dampening the shock of waves as the ship moves through the water.

U.S. Pat. Nos. 3,326,202; 3,678,874; 3,707,936; 4,058,077; and 6,138,601 show the mechanical movement of hull mounted planes to adapt a boat hull to different water and wave conditions.

U.S. Pat. Nos. 3,925,837; 3,981,259; 5,265,550; and 5,517,940 show side-to-side boat sections that are connected to mechanically convert between multi-hull configurations.

U.S. Pat. Nos. 3,119,128 and 5,540,169 disclose sectional boats having pontoon and boat sections placed end-to-end, and capable of being disassembled for transportation between remote locations.

U.S. Pat. Nos. 4,438,343 and 4,966,254 each disclose a device that may be installed on a marine vessel for converting the wave motion of a body of water to electrical energy.

And U.S. Pat. Nos. 3,758,788; 4,164,383; and 4,375,151 disclose different means for converting wave motion to electrical energy by using fluid material such as air that is pressurized through the normal action of waves moving toward shore.

Although sectional boats and variable hulls are known, the prior art does not disclose or teach about a variable hull modular boat that is effective to attain the objects of the invention. Moreover, the prior art does not show how movable parts of a boat structure may be used to capture and convert to useful energy the pounding shock energy sustained from wave action and surface impact as it travels across a water surface.

PURPOSE OF THE INVENTION

The primary object of the invention is to provide a multi-functional, variable hull water craft that converts to or from a V-shaped hull having a depth of choice, a flat bottom or catamaran, and that has the capacity to make such a conversion in short real time while on the water.

Another object is to provide a sectional boat having a plurality of independently packaged modules that can be assembled by the dealer or consumer to thus establish in the boating industry the expanded capability in the manufacture, storage, transport, and versatility as proven in the automotive and housing markets.

A further object of the invention is to provide a variable hull modular water craft that may be easily upgraded and/or enlarged to virtually any desired length through the use of interlocking sealed modules chat may be added as desired.

A still further object of the invention is to prove a modular vessel that is transportable inside a station wagon, van, light truck, train, or light aircraft, and may be launched from any waterside location including areas where no available launching ramps or hoists.

SUMMARY OF THE INVENTION

The variable hull modular vessel of the invention comprises a plurality of boat forming modules including a bow section module, a load section module having a bow end and an aft end, and a bulkhead forming module detachably connected to each said bow and aft end of the load section module. The bulkhead forming module that is connected at the bow end of the load section module is detachably connected to the bow section module. Each of the boat forming modules and bulkhead forming modules include a topside section and a hull bottom side section. The topside section of each boat forming module has a shell gunnel portion, and the hull bottom side section of each boat forming module has a pivotally mounted bottom shell hull portion. Gunnel and hull portions of the load and bow section modules that are connected end-to-end are sealingly juxtaposed the detachably connected bulkhead forming module to prevent water from entering the boat when it engages water. The boat includes means for moving the pivotally mounted bottom shell hull portion to form a preselected hull shape.

In a specific embodiment, a plurality of boat forming modules includes an aft section module detachably connected to a bulkhead forming module that is connected to the aft end of the load section module. The bulkhead forming module includes the means for moving the pivotally mounted bottom shell hull portion. And the aft section module includes an outboard motor attachment section. In another embodiment, pneumatic bellows mounted in a keel tunnel extending along the length of the hull bottom section effects the pivotal movement of a bottom shell hull portion.

A feature of the invention is directed to a plurality of boat forming modules connected end-to-end and including a boat control module, an aft section module, and a plurality of load section modules including a front load section module and a rear load section module. The boat control module is located between the front load section module and the bow section module, and a bulkhead forming module is detachably connected between each boat forming module. Means for motor ignition may be mounted in the control module to start the motor of a power boat. Activation control means for actuating the means for pivotably moving the bottom shell hull portion may also be mounted in the control module to change the shape of the hull configuration as desired. In another embodiment, a boat of the invention has a bow section module that includes a bow rider module directly connected to a nose module. Therefore, in addition to those carried in the load section and control modules, passengers may also ride in front of the control module.

A feature of the invention comprises a nose module that includes means for fastening one end of a plurality of flexible tightening lines that extend from the nose module along the length of the boat to the aft section module which includes means for drawing the tightening lines taut to effect the detachable connection between boat forming and bulkhead forming modules. The hull bottom side of the connected plurality of boat forming and bulkhead forming modules defines a downwardly directed keel tunnel that longitudinally extends the length of the boat, and the pivotally mounted bottom shell hull portion is disposed across the keel tunnel. Compressed air tank means provide an air source to operate bellows means located within the keel tunnel and inside the shell hull portion for moving the pivotally mounted bottom shell hull portion. The tank means is thus operatively coupled to expand and contract the bellows means by moving air into and out of the bellows means in response to actuating means for effecting the pivotal movement of the bottom shell hull portion to a desired hull shape.

In a specific feature of the invention, the bellows means of the boat is effective to dampen shock resulting from waves pounding against the hull portion, and from recurring striking contact with the water because of the up-and-down boat bow movement as it travels along the surface of the water. Energy conversion means located in the boat and responsive to the shock energy induced movement of the bellows means is effective to convert the induced shock absorbing energy obtained by the bellows mechanism into useful compressed air or electrical energy.

A marine vessel of the invention comprises a plurality of vessel forming modules including a bow section module, a load section module having a bow end and an aft end, and a bulkhead forming module detachably connected to each said bow and aft end of the load section module. The bulkhead forming module that is connected at the bow end of the load section module is detachably connected to the bow section module. Each vessel forming and bulkhead forming module includes a topside section and a hull bottom side section, and the load and bow section modules that are connected end-to-end are sealingly juxtaposed the detachably connected bulkhead forming module to prevent water from entering the vessel when said vessel engages water. The bow section includes means for fastening one end of a plurality of flexible tightening lines that extend along the length of the vessel to the aft section module which includes means for drawing taut the tightening lines for enhancing the detachable connection between the vessel forming and bulkhead forming modules.

In a specific embodiment, the plurality of vessel forming modules includes a vessel control module, an aft section module, a plurality of load section modules including a front load section module and a rear load section module. The vessel control module is located between the front load section module and the bow section module, and a bulkhead forming module is detachably connected between each vessel forming module. The hull bottom side of the connected plurality of vessel forming modules defines a downwardly directed keel tunnel that longitudinally extends the length of the vessel, and the pivotally mounted bottom shell hull portion is disposed across said keel tunnel.

A feature of the marine vessel invention comprises a topside section for carrying a load, and a hull bottom side section including means for absorbing shock energy to dampen shock energy resulting from waves pounding against said hull portion, and from recurring striking contact with the water because of the up-and-down vessel bow movement as the vessel travels along the surface of the water. Energy conversion means located in the vessel and responsive to the shock energy induced movement of the bellows means is effective to convert the induced shock energy into useful energy such as is supplied by compressed air, or into electrical energy. The shock energy absorbing means includes fluid medium that is selected from the group of air and hydraulic liquid is the operating material used to run the energy conversion means. More specifically, the shock energy absorbing means includes pneumatically operated bellows means for compressing air in response to said shock energy.

Another feature of the marine vessel of the invention comprises a topside section for carrying a load, and a hull bottom side section which includes a downwardly directed keel tunnel that longitudinally extends the length of the vessel. A pivotally mounted bottom shell hull portion is disposed across the keel tunnel for changing the hull configuration. Compressed air tank means is operatively connected to bellows means which is located within the keel tunnel inside the bottom shell hull portion. The bellows means is effective to expand and contract, and includes valve means for moving air into and out of said bellows means as it expands and contracts. Activation means is provided for actuating the bellows means and tank means for moving the pivotally mounted bottom shell hull portion to a desired hull shape.

BRIEF DESCRIPTION OF DRAWINGS

Other objects of this invention will appear in the following description and appended claims, reference being made to the accompanying drawings forming a part of the specification wherein like reference characters designate corresponding parts in th several views.

FIG. 7 is a fragmentary perspective view of another embodiment of a boat of the invention shown without deck and topside portions, and showing details of sealing mechanisms used at juxtaposed boat shell sections;

FIG. 8 is a fragmentary perspective bottom view of a bulkhead forming module showing a detail of a sealing device used in the boat of FIG. 7;

FIG. 9 is a fragmentary perspective section view of the detail shown in the circle designated IX in FIG. 7;

FIG. 10 is a fragmentary perspective section view of the detail shown in the circle designated X in FIG. 7;

FIG. 12 is a perspective bottom view of another embodiment of a marine vessel of the invention having a keel tunnel and a pivotally mounted bottom shell hull portion;

FIG. 13 is a diagrammatic section view along line XIII—XIII of FIG. 12 showing a load keel tunnel section of the marine vessel;

Figure 22:
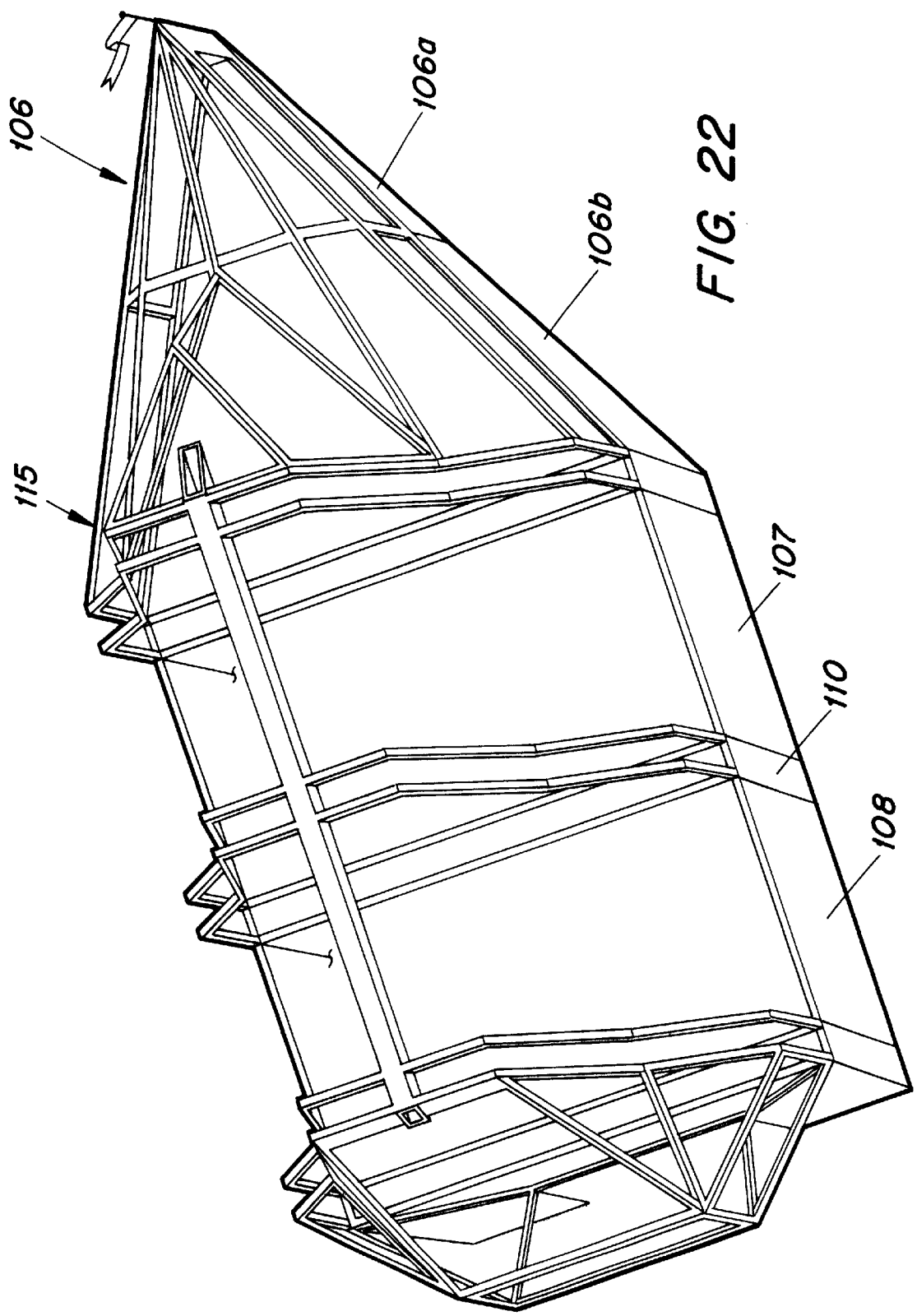

FIG, 14 is a fragmentary section view along the longitudinal axis of the marine vessel of FIG. 12 showing one of its bellows devices in a fully expanded, lowered position;

FIG. 15 is a fragmentary section view along line XV—XV of FIG. 14;

FIG. 16 is a fragmentary section view along the longitudinal axis of the marine vessel of FIG. 12 showing the bellows device of FIG. 14 in a retracted position;

FIG. 17 is a fragmentary section view along line XVII—XVII of FIG. 16;

FIG. 18 is a fragmentary section view along the longitudinal axis of the bow of the marine vessel of FIG. 12 showing one of its bow bellows in a fly expanded, lowered position;

FIGS. 18a, 18b, 18c, and 18d are fragmentary section views along respective lines A—A, B—B, C—C, and D—D of FIG. 18;

FIG. 19 is a schematic flow diagram of an energy conversion system incorporating the use of compressed air as a source of energy development;

FIG. 20 is a schematic flow diagram of an energy conversion system incorporating the use of fluid medium to operate an electric generator to produce electrical energy;

FIG. 21 is a fragmentary top perspective view of the bottom hull portion of another embodiment of the vessel of the invention;

FIG. 22 is a fragmentary top perspective view of the topside superstructure for the upper shell portion of the vessel of FIG. 21;

FIG. 23 is a top plan view the completed vessel of FIG. 21; and

FIG. 24 is a side elevation view of the vessel of FIG. 23.

DETAILED DESCRIPTION OF SPECIFIC EMBODIMENTS

The superstructure of the marine vessel of the invention forms the hull shape, and works on the same principle as an airframe does in an aircraft. The vessel's interconnecting rods and bulkheads fit together to form a complete boat frame to which either an inflatable or rigid skin may be attached. It thus has all the advantages of both the inflatable and rigid hull boats without the possible disadvantages of either one. The structure used in an inflatable hull is the same boat frame used in a rigid hull design. It provides for both the modularity and the variable hull along with another unique aspect for the inflatable version. For if all of the air is removed from every chamber in the vessel, the boat will still function inflation is only needed for maximum performance not flotation. So the vessel overcomes the greatest disadvantage of inflatable boats by eliminating the dangers associated with hull punctures.

In one embodiment, the method for moving the variable hull of the invention allows the operator to change the hull to any shape within an 18 inch span of movement that exists from a V-shaped bottom to a multi-hull configuration, and maintains the selected hull shape until the operator initiates a change. Four methods of moving the variable hull include pneumatic, mechanical, hydraulic, or electro-mechanical actuators. Pneumatic actuators include bellows units located in the vessel forming modules and the mechanical, hydraulic, or electro-mechanical units are located in the bulkhead modules. A series of pneumatic actuators provides a clean light-weight system that operates the hull transformation. A system of metering valves and lines a full motion system that is unable to stop at various intervals to achieve the various hull configurations. A mechanical method uses worm gear driven jackscrews located in the bulkhead modules to transform the hull shape. An electric motor drives the worm gear mechanism and is actuated by manually moving a dial on an instrument panel in a control section of a bow forming module. A hydraulic method uses fluid reservoirs and high pressure lines that are fitted to hydraulic rams in the same position as the mechanically operated jackscrews. A hydraulic pump, regulated through a sequence of valves, actuates and controls the rams that move the hull in the direction needed to change the hull shape. An electro-mechanical method uses actuators that need no external drive mechanisms or fluid support systems. Each unit is a self-contained, clutch regulated drive which needs only electrical wiring and sequencers to operate, and can be contained as individual modules and may be easily installed or removed from the system. Like the electric motor driven mechanical method, the operator manually moves an instrument panel dial to select a position of the hull and activate the actuators to transform the hull shape.

Each bulkhead module in one embodiment of the invention supports and fully contains a set of mechanical hull conversion rods and actuators which operate the variable hull. Through holes located at various positions on the bulkhead modules act as alignment receptacles and fasteners for the superstructure of the other boat forming modules. Another function of the bulkhead modules is its sealing system which forms a tight tongue and groove seal with each juxtaposed boat forming module and pivoting hull bottom panels.

Two types of a bulkhead forming module may be used with the modular marine vessel of the invention. An internal bulkhead module allows the boat forming modules to seal against each other along a single line. An external type of a bulkhead forming module of the invention is coextensive and flush with the outside of the hull to form an externally visible line joint with an abutting juxtaposed boat forming module. Each of these internal and external units generally contains a hull conversion mechanism and fastening devices. Apparatus used to convert the shape of the hull configuration may be located in portions of the vessel other than the bulkhead module, however. The beam width of 7 to 8 feet may be reduced upon disassembling the vessel by splitting the bulkhead module into two hinged segments, which can be folded together to form 42 inch wide module instead of the full 7 foot beam width.

The modules of the invention are detachably connected so that any single fastening device may be used to maintain a good margin of safety. Several possible types of coupling mechanisms may be used including a combination of fastening techniques to add a measure of safety for making modular separation impossible duing the use of the assembled water craft. A male/female joint attaches bulkhead and boat forming modules that come together and are locked into place after threading a fastening draw cable or line through rods that attach any two sections. Each draw cable runs from the bow through to the stern where it is fastened to securely lock the plurality of modules together. When the modules are secured into position, they form a single or double joining lines, depending on which type of bulkhead module is used.

The invention includes a fail-safe sealing system that has unique capabilities while in a water environment. Each seal is designed for minimum wear that is caused by recurring assembly, disassembly, and actuation of the variable hull. The seals are water-tight, and easily formed as an integral part of each assembled unit as each juxtaposed module is attached together by three basic sealing systems. Each module end fits together in a tongue and groove design which provides a seal that extends up around the side of the hull and into the inside of the vessel. The length of this seal is determined by the type of bulkhead module used. The two pieces fit together in a wedge fashion sealing tightly when the modules are drawn together. In addition, a dart sealing system fastens to the outer rim of the bulkhead module, and interlocks two independent dart sections from the base of each juxtaposed modules with a receiver and spreader assembly. An overlapping seal may be used to cover both the tongue and groove seal and the dart seal. This seal fits snugly against the adjoining hull section, and along a juxtaposed module connected ahead of a bulkhead module.

Figure 1:
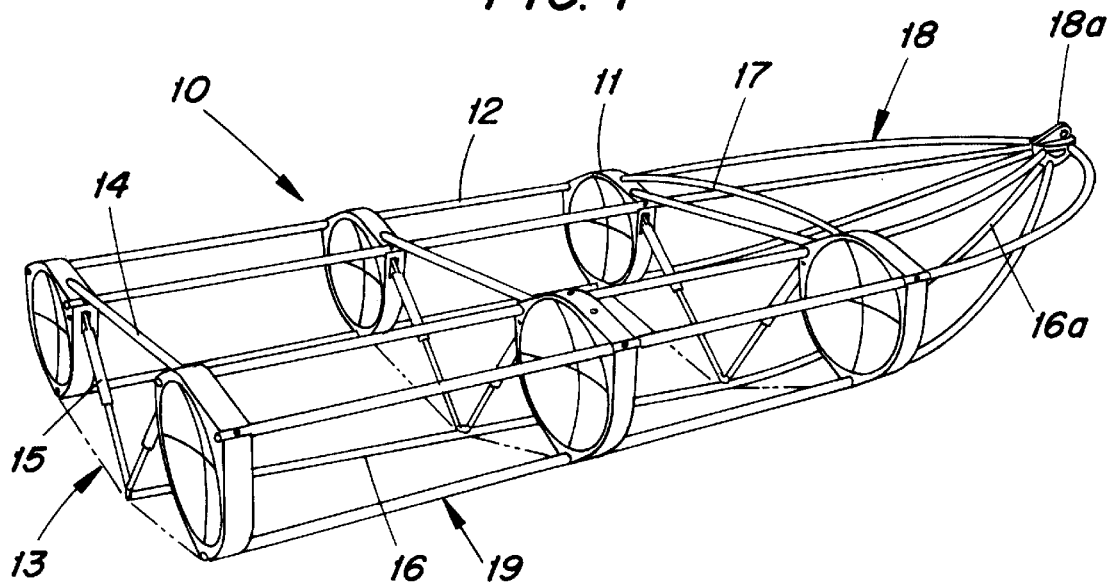
FIG. 1 is a diagrammatic perspective view of a superstructure for a marine vessel of the invention shown without an outer shell covering.
Figure 2:
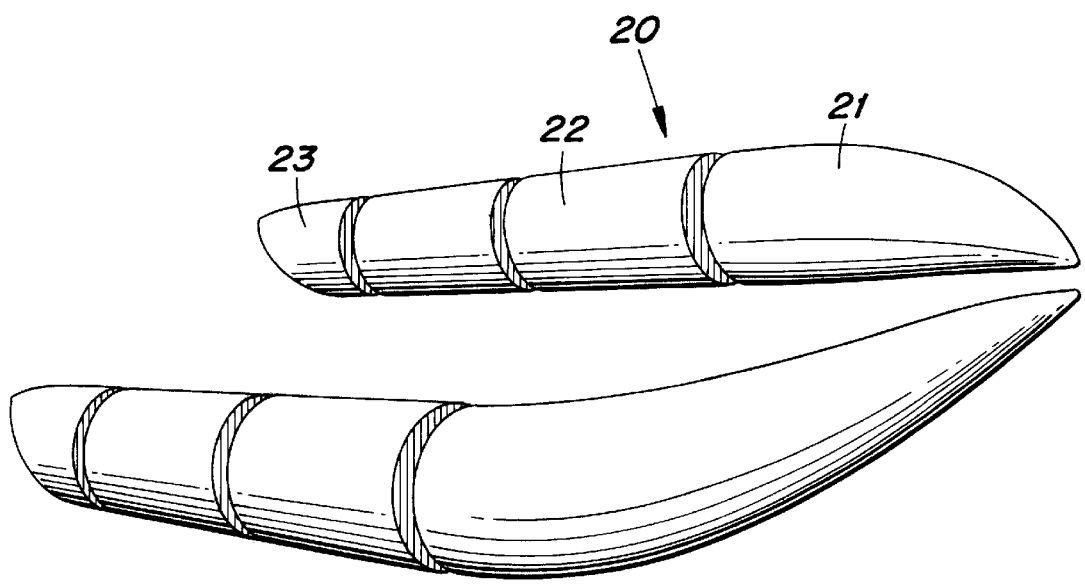
FIG. 2 is a diagrammatic perspective view of the pontoon configuration designed to for use with the superstructure of FIG. 1.

The boat of FIGS. 1 and 2 has a superstructure 10 and a plurality of flexible containers, which are sponsons that each define an inflatable chamber. The rounded ends of each flexible container or sponson 21, 22, and 23 fit and detachably connect to ring connectors of each bulkhead forming module as shown, and are shaped to fit within the space formed by six through rods 12, and the rods forming the shape of bow forming module 18. The boat may have an inflatable or rigid shell 13, which is not shown for clarity of viewing the inner construction of the invention. Aft sponsons 23 removably connect to aft bulkhead module 11, four load section sponsons 22 removably attach to bulkhead modules 11 at each end of load section modules 19, and two bow sponsons 21 fit into bow forming module 18.

Superstructure 10 has two bulkhead forming modules 11 that separate two load section modules 19, and separate the forward load section module 19 from bow forming module 18. A third bulkhead forming module 11 is located on the aft or rear end of the rear load section module. Each bulkhead section module 11 includes a vertically movable keel rod 16 and two pivotally mounted telescoping rod and cylinder units or jackscrews 15 that operate to raise and lower the position of keel rod 16 when moving from one hull configuration to another. Bow forming module 18 includes a nose mechanism 18a to which keel bow rod 16a is pivotally mounted to enable movement for changing the shape of the hull. Any available activating mechanism (not shown) may be used to effect the desired telescoping movement of jackscrews 15. Each bulkhead cross-rod 14 provides stable support for a shell and deck portion and curved cross-rod 17 gives support for a curved bow shell topside surface.

Superstructure 10 thus forms the entire boat shape and is integral to all of the modules, fasteners, and variable hull, and does not depend on the air of an inflatable shell, or on the rigidity of material used in a hard shell for strength and integrity. Shell parts forming the hull bottom and topside section, deck parts, bulkhead modules, sealing parts, fasteners, sponsons, cable material, tubes for cable, module rods, and the like for the vessels of the invention are constructed of standard marine approved materials such as polyvinylchloride (PVC), plexiglass, nylon, marine plywood, rubber, stainless steel, aluminum, and hypalon. The boat may be made of any combination of the two types of material, namely, flexible inflatable and/or rigid. For example, a boat shell may be made with soft inflatable sides and have a rigid bottom. The boat of the invention thus meets the needs of changing surface and weather conditions as well as the varied and changing needs of the consumer, and performs as well or better than any single purpose boat currently available in the given configuration selected.

Figure 3:
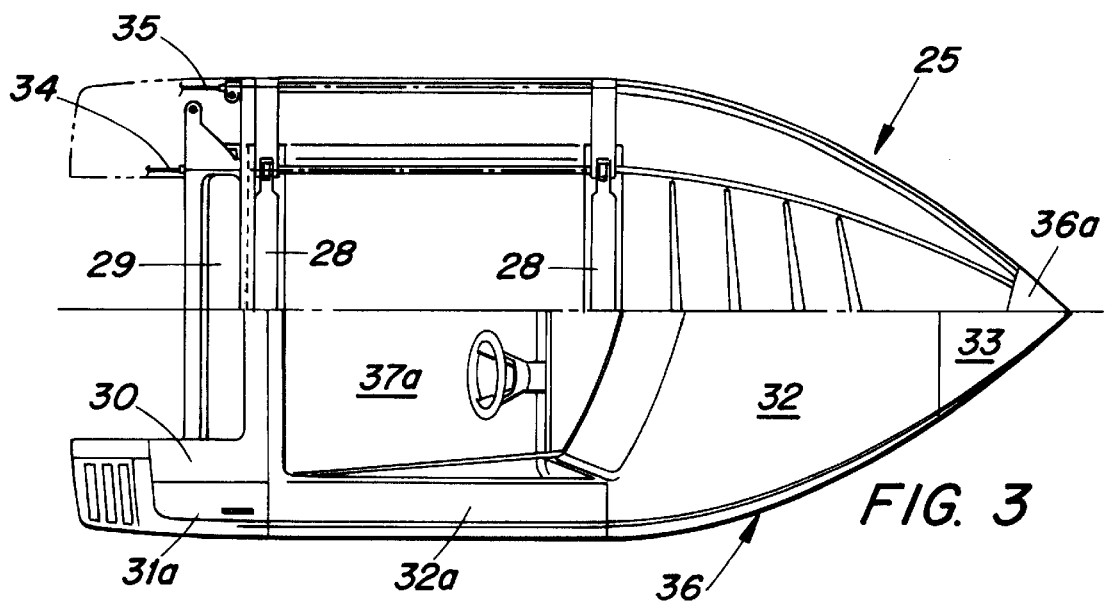
FIG. 3 is a diagrammatic fragmentary top plan view of a boat of the invention showing a portion of the inner structure of another embodiment making use of a superstructure and pontoon configuration like that of the FIG. 1 embodiment.
Figure 4:
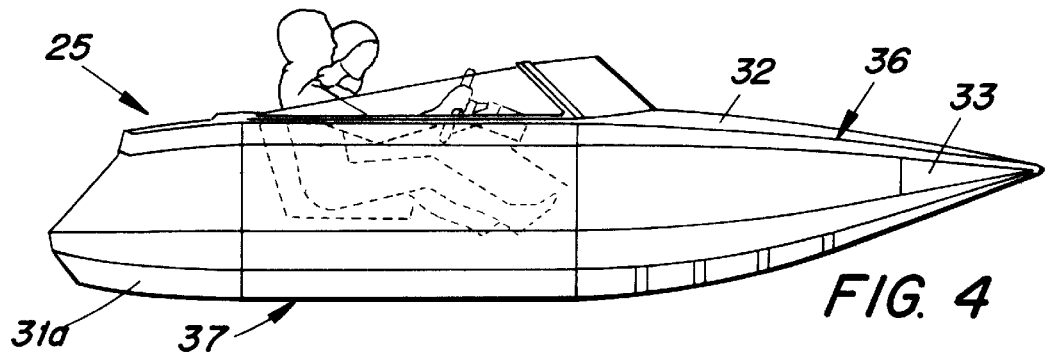
FIG. 4 is a side elevation view of the embodiment of FIG. 3.
Figure 5A:
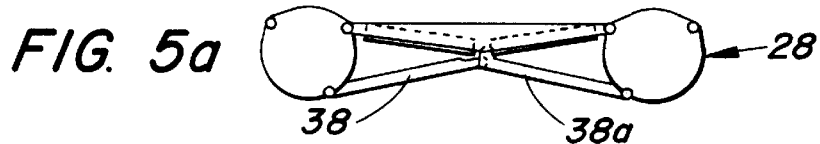
FIGS. 5a, 5b, and 5c are diagrammatic front elevation views of a bulkhead forming module as shown in the embodiments of FIGS. 1 and 3 and depicting respectively different hull shell configurations in accord with the invention.
Figure 5B:
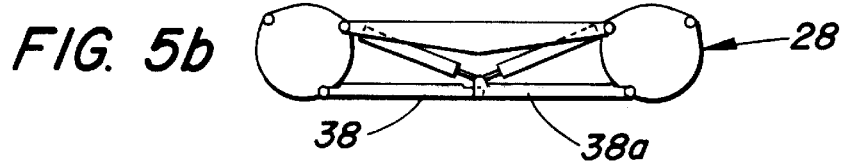
Figure 5C:
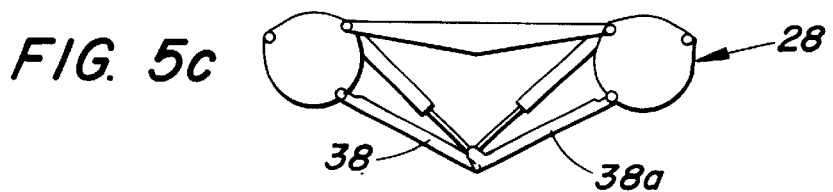
Figure 6:
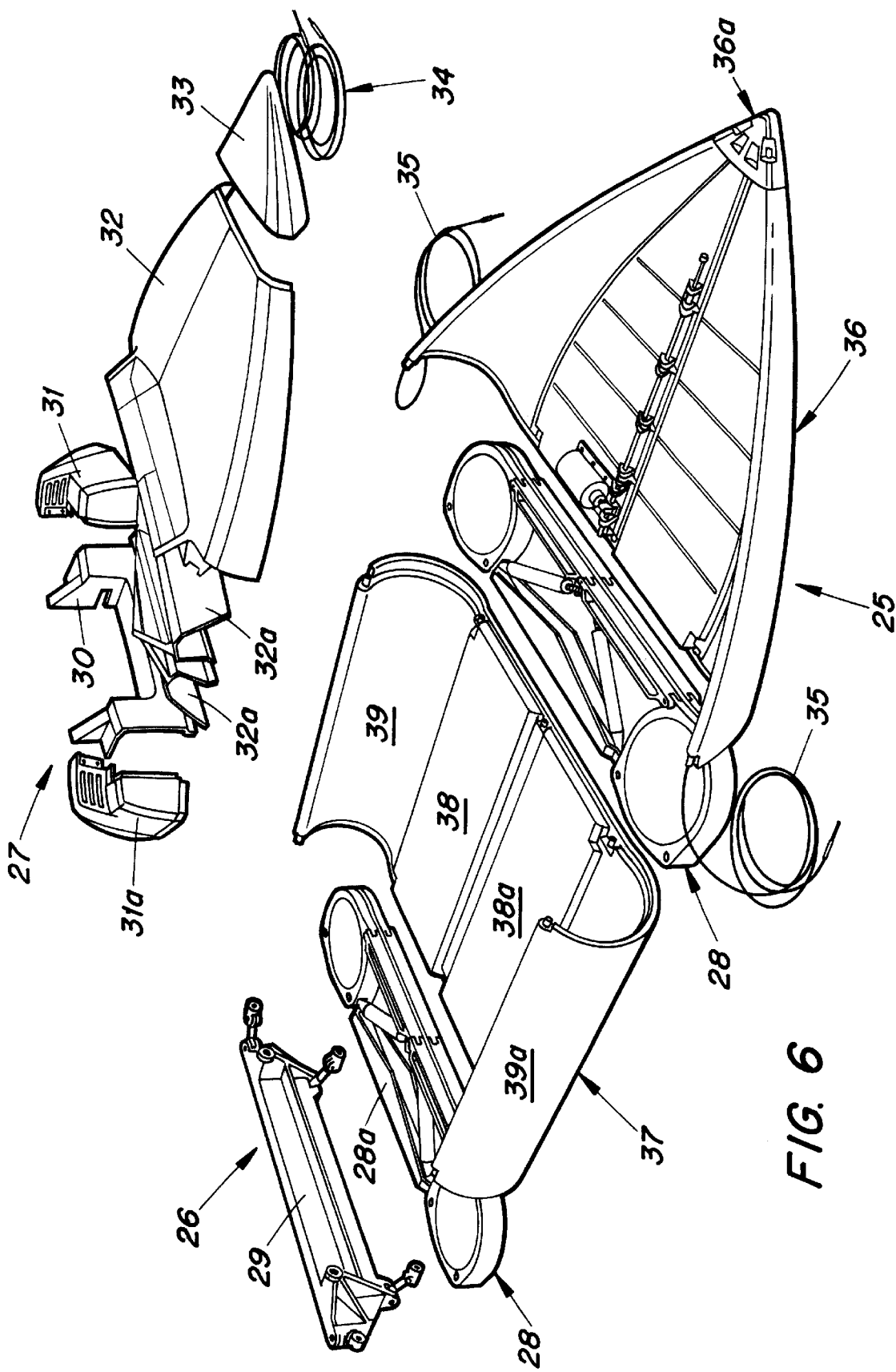
FIG. 6 is a diagrammatic perspective view of a disassembled boat of FIG. 3 without sponsons and showing details of flexible fastening lines and a mechanical structure for converting the shape of the hull configuration in accord with the invention.

The vessel 25 (FIGS. 3–6) includes a bow module, generally designated 36, load section module 37 having a deck 37a, aft superstructure section 29 covered by aft shell sections 30, 31, and 31a, and bulkhead modules 28. Load section module 37 has gunnel shell portions 39 and 39a pivotally mounted to hull panels 38 and 38a. Fastening lines or cables 35 fixed to the nose line attachment 36a are threaded through bow gunnel tubes as shown in FIG. 6. Fastening cables 34 when fixed to nose line attachment 36a are threaded through tubes that extend the length of vessel 25. Cables 34 and 35 extend through aft frame structure 29 and are drawn taut at the aft structure using known line tightening means so that the juxtaposed modules are firmly held together to form the assembled vessel as shown in FIG. 3.

The modular sections in the specific embodiments described herein may each have a length of about 4–6 feet with an overall boat length of about 16–26 feet, and a beam width of about 7–8 feet. These lengths may obviously vary depending on the desire of consumers. For boat length depends on how many modules are used, and is thus a matter of the consumer's choice.

Topside shell sections 30, 31, 31a, 32, 32a, and 33 complete the vessel once the bottom hull and gunnel portions, generally designated 26, are assembled. Bow module 36 includes boat control mechanisms for ignition of a motor (not shown) attached to aft motor attachment shell section 30 that covers support frame 29. Each bulkhead module 28 includes a deck supporting tie member 28a, and a pair of cylinder and rod devices or jackscrews that telescope in and out to pivot hull panels 38 and 38a to provide the respective dual hull, flat bottom hull, and V-shaped hull configurations of FIGS. 5a, 5b, and 5c. Additional boat control mechanisms in bow module 36 include controls for the operation of the telescoping cylinder and rod devices or jackscrews to thus change the shape of the hull configuration as desired.

Vessel 40 (FIGS. 7–10) comprises rod constructed frames fitted to match with four different modules including bow module 42 having a control section 41 and a nose section 43, forward load section module 44, and stern or rear load section module 46. As in the embodiments of FIGS. 1–6, six rods or tubes that extend the length of each vessel forming module, three per side, are identically located on its port and starboard sides, and support its hull structure. The rods attach each bulkhead module 45 together with a juxtaposed boat forming module, and form hinge rod sections at pivot joints where pivotable hull panels 47, 49, 57, and 59 are hinged to pivot and move about fixed hull segments with hinge structures (not shown). Aft module 48 connects to the rear bulkhead module 45, and provides swim step and outboard motor attachment portions as in the embodiment of FIGS. 3–6

Each bulkhead module 45 includes hull bottom tie members 61 that are pivotally connected at pivot joint 65. Each tie member 61 has an undercut groove 61 in which an elongated sealing base member 62 is disposed (FIGS. 8–9). Two grooves on opposing sides of tie member 61 receive a respect edge of juxtaposed pivotal hull bottom panels 53 and 59. A dart sealing system, generally designated 60, seals the connection between adjacent hull bottom panels 53 and 59 when fastened to the outer rim of bulkhead module 45. Base member 62 includes an undercut groove that receives and interlocks with a center male dart section 63 which is compressed when two outer dart sections 64a and 64b pivot into place from the bottom of each juxtaposed module as shown (FIG. 9).

The system of FIG. 10 is designed for sealing adjacent pivotal bow hull bottom panels such as panels 53 and 58. Pivotal joint seal, generally designate 55, includes a bottom groove forming seal member 54 that extends across the beam width of the pivotally mounted hull bottom panels and sealingly engages tongue member 54a. Panel edge brackets 56a and 56b are disposed on facing edges of pivotal bow hull bottom panels 53 and 58. Battery powered electrical control unit 50 rotates keel drive members 51 and 52 to operate the gear driven jackscrews mounted to each bulkhead module 45 for pivoting tie member 61 when the boat operator desires to change the hull configuration.

At each joint between an adjacent pair of pivotal bow hull bottom panels, drive member 52 extends through a pair of upwardly projecting bearing bushings in which flexible connecting rod segment is rotatably mounted. Panels 53 and 58, for example, pivot about keel, and port and starboard pivot points when keel pivot drive member 52 rotates on activation of control unit 50 to change the hull configuration.

As panels 53 and 58 move about their end pivot points, rod segment 52b flexes as they move up or down. The overlapping bottom seal portions of seal member 54 provide a further water-tight seal as shown. Any overlapping seal may be used to cover both the tongue and groove seal and the dart seal fitting snug against the adjoining hull section and fastened to the forward most module.

Figure 11A:
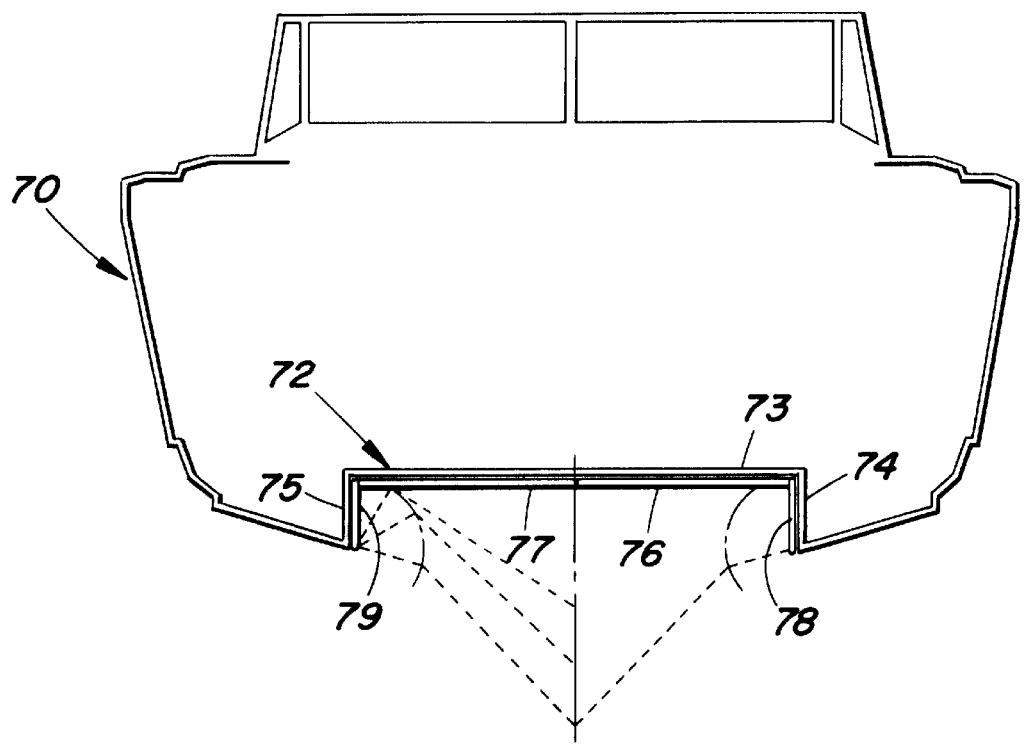
FIGS. 11a, 11b, and 11c are fragmentary front elevation view of another embodiment of a marine vessel of the invention having a keel tunnel and showing respectively different hull shell configurations in accord with the invention.
Figure 11B:
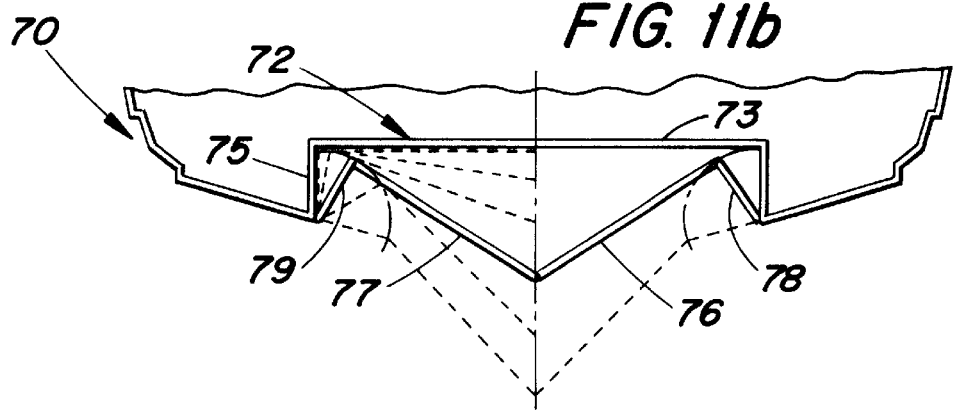
Figure 11C:
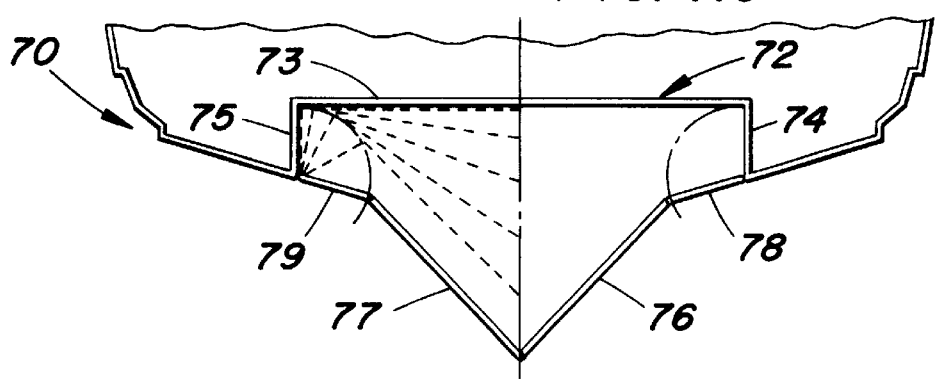

Vessel, generally designated 70, includes a keel tunnel 72 that extends the length of its hull bottom section, and a bottom hull shell portion that may form three different hull configurations as shown in FIGS. 11a, 11b, and 11c. Hull keel panels 76 and 77 pivot to tunnel roof 73, and keel hull panels 78 and 79 pivot to respective opposing keel tunnel sides 74 and 75. Any of the different types of pivoting drive systems disclosed herein may be used to effect pivotal movement of the bottom shell hull portion that includes keel panels 76, 77, 78, and 79 and is disposed across keel tunnel 72 as shown.

In another specific embodiment, vessel, generally designated 80, includes bow forming module 81 having a nose section 81a and a control section 81b, forward load section module 85, stern load section module 86, and bulkhead forming modules 84 detachably connected to each forward and rearward end of load modules 85 and 86, and to bow module 81. Keel tunnel 88 (shown in phantom in FIG. 12) includes a keel tunnel load section 88a and bow section 88b wherein compressed air tanks 92 and 93 are disposed along its entire length. Load section bellows 90 and 91 are located in the forward and stern load section modules 85 and 86 between bulkhead modules 84 disposed at each end of modules 85 and 86. As more specifically shown in FIGS. 13–17, keel pivoting hull portion 82 moves between a deep V-shape hull configuration (FIGS. 13–15) and the depicted tri-hull configuration of FIGS. 16 and 17. Bow section bellows 89 and compressed air tanks 94 are tapered as shown in FIG. 18 to fit the contour of the keel tunnel bow section 88b. Compressed air tanks 92, 93, and 94 are a source of air for expanding bellows 89, 90, and 91, and may be part of an energy conversion system for generating additional energy as described below. The location of the surface of the water with respect to vessel 80 is shown in FIG. 13.

The bellows of the embodiment shown in FIGS. 12–18 dampen damaging shock resulting from power boats lifting several feet in the air and slamming down on the water at even moderate speeds in moderate sea conditions. In addition to being shock absorbers, the invention contemplates converting such shock energy to a form of recoverable energy that may be used for other beneficial purposes (FIG. 19). The energy conversion system of FIG. 19 shows the water shock energy 95 being absorbed by pneumatic bellows 96 to cause air to pass from bellows 96 by way of a one-way valve device into air tank 97 when shock energy 95 compresses bellows 96. Another one-way valve device then opens when the bellows expands as a result of a valve regulation device to allow more air to enter the bellows in preparation for further dampening of shock energy. In this manner, pressure is built up in air tank 97 and the excess air may then be used to drive an air driven prime mover 98 so as to gain beneficial use of recoverable energy 99. The energy conversion system of FIG. 20 contemplates the use of fluid medium such as hydraulic fluid in addition to compressed air to produce electrical energy 103 from a fluid electric generator 102 that operates when fluid medium of a fluid shock energy response device 101 drives generator 102 in response to receiving the water shock energy 100 derived from bellows 89, 90, and 91 as discussed above. Such fluid medium energy conversion systems are known for use in converting wave energy at ocean beach locations. However, this invention is the first to contemplate the capture and conversion of such water shock energy using such a fluid medium system that is an integral part of the basic structure of a marine vessel.

Examples of such beneficial purposes may be the use of air driven propellers to drive the boat should the engines fail, to supplement and/or boost the engine driven props, or to quietly propel the vessel not using its motors for stealth/military use, or for use in fishing. In addition to propulsion, compressed air may also be used for steering thrusters, as a turbo charger and/or a augmentation to motor fuel injectors for mixing air and water and force feeding the engine to burn more cleanly, have better combustion, and thus improve fuel mileage. Any available compressed air may also be used for filling inflatable boats, towing devices, mattresses, refilling scuba tanks and running several of the creature comfort items of the recreational market. It can charge batteries to directly power some of these items, air conditioning or other boating accessories. Known compressed air powered weapons fire projectiles that might be used to cause controlled avalanches at their desired timing rather than when the slopes are full of skiers.

In another embodiment, marine vessel 120 includes a bottom hull portion 105 and a topside frame structure 115 that supports the topside shell of the completed boat (FIGS. 21–24). Hull portion 104 includes bow module 106 having a nose section 106a and control section 106b, forward load section module 107, stern load section module 108, and three bulkhead modules 110. Keel tunnel 112 extends the length of vessel 120 to form a double hull catamaran. Topside frame structure 115 includes the openings for disposing two starboard hatch covers 121 and two port hatch covers 122 that hinge along the top edge thereof to pivotally swing upwardly from the top edge of hull portion 105. Hatch cover handles 121a and 122a are for manually pivoting each respective hatch cover 121 and 122. The completed vessel 120 includes starboard windows 123 and 125, and port windows 124 and 126, and a rear window While the variable hull modular boat and marine vessel of the invention have been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A modular marine vessel having a variable hull, said vessel comprising:
    a) a plurality of boat forming modules including a bow section module, a load section module having a bow end and an aft end, and a bulkhead forming module detachably connected to each said bow and aft end of the load section module;
    b) said bulkhead forming module that is connected at said bow end of the load section module being detachably connected to said bow section module;
    c) each said boat forming and bulkhead forming module including a topside section and a hull bottom side section,
    d) said topside section of each boat forming module having a shell gunnel portion, and said hull bottom side section of each boat forming module having a pivotally mounted bottom shell hull portion;
    e) said gunnel and hull portions of said load and bow section modules that are connected end-to-end being sealingly juxtaposed said detachably connected bulkhead forming module to prevent water from entering the boat when said boat engages water; and
    f) means for moving said pivotally mounted bottom shell hull portion to form a preselected hull shape.

2. A vessel as defined in claim 1 wherein
    said means for moving said pivotally mounted bottom shell hull portion to form a preselected hull shape is mounted in said bulkhead forming module.

3. A vessel as defined in claim 1 wherein
    said plurality of boat forming modules includes an aft section module detachably connected to the bulkhead forming module that is connected to the aft end of said load section module.

4. A vessel as defined in claim 3 wherein
    said aft section module includes an outboard motor attachment section.

5. A vessel as defined in claim 1 wherein
    said plurality of boat forming modules includes a boat control module in which are mounted means for motor ignition to start the motor of a power boat and activation control means for actuating said means for moving the pivotal bottom shell hull portion to form said preselected hull shape.

6. A vessel as defined in claim 1 wherein
    said plurality of boat forming modules includes a boat control module, an aft section module, a plurality of load section modules including a front load section module and a rear load section module,
    said boat control module is located between said front load section module and said bow section module, and
    a bulkhead forming module is detachably connected between each said boat forming module.

7. A vessel as defined in claim 6 wherein
    said bow section module includes a bow rider module directly connected to a nose module.

8. A vessel as defined in claim 7 wherein
    said nose module includes means for fastening one end of a plurality of flexible tightening lines that extend along the length of the boat to the aft section module which includes means for drawing taut said tightening lines for enhancing the detachable connection between said boat forming and bulkhead forming modules.

9. A vessel as defined in claim 1 wherein
    said hull bottom side of said connected plurality of boat forming modules defines a downwardly directed keel tunnel that longitudinally extends the length of the boat, and
    said pivotally mounted bottom shell hull portion is disposed across said keel tunnel.

10. A vessel as defined in claim 9 wherein
    compressed air tank means provide an air source to operate bellows means located within said keel tunnel inside said bottom shell hull portion,
    said tank means is operatively coupled to said bellows means to expand and contract the bellows means by air moving into and out of said bellows means in response to actuating means for moving said pivotally mounted bottom shell hull portion to a desired hull configuration.

11. A vessel as defined in claim 10 wherein
    said compressed air tank means is located within said keel tunnel.

12. A vessel as defined in claim 10 wherein said bellows means is effective to dampen shock energy resulting from waves pounding against said hull portion, and from recurring striking contact with the water because of the up-and-down boat bow movement as the boat travels along the surface of the water.

13. A vessel as defined in claim 12 wherein energy conversion means located in the boat and responsive to the shock energy induced movement of the bellows means is effective to convert said induced shock energy into useful compressed air or electrical energy.

14. A marine vessel comprising:

a) a plurality of vessel forming modules including a bow section module, a load section module having a bow end and an aft end, and a bulkhead forming module detachably connected to each said bow and aft end of the load section module;

b) said bulkhead forming module that is connected at said bow end of the load section module being detachably connected to said bow section module;

c) each said vessel forming and bulkhead forming module including a topside section and a hull bottom side section, d) said load and bow section modules that are connected end-to-end being sealingly juxtaposed said detachably connected bulkhead forming module to prevent water from entering the vessel when said vessel engages water; and e) said bow section including means for fastening one end of a plurality of flexible tightening lines that extend along the length of the vessel to the aft section module which includes means for drawing taut said tightening lines for enhancing the detachable connection between said vessel forming and bulkhead forming modules.

15. A vessel as defined in claim 14 wherein said plurality of vessel forming modules includes a vessel control module, an aft section module, a plurality of load section modules including a front load section module and a rear load section module, said vessel control module is located between said front load section module and said bow section module, and a bulkhead forming module is detachably connected between each said vessel forming module.

16. A vessel as defined in claim 14 wherein said hull bottom side of said connected plurality of vessel forming modules defines a downwardly directed keel tunnel that longitudinally extends the length of the vessel, and said pivotally mounted bottom shell hull portion is disposed across said keel tunnel.

17. A vessel as defined in claim 16 wherein compressed air tank means provide an air source to operate bellows means located within said keel tunnel inside said bottom shell hull portion, said tank means is operatively coupled to said bellows means to expand and contract the bellows means by air moving into and out of said bellows means in response to actuating means for moving said pivotally mounted bottom shell hull portion to a desired hull configuration.

18. A vessel as defined in claim 17 wherein said compressed air tank means is located within said keel tunnel.

19. A marine vessel comprising:

a) a topside section for carrying a load, and a hull bottom side section including means for absorbing shock energy to dampen shock energy resulting from waves pounding against said hull portion, and from recurring striking contact with the water because of the up-and-down vessel bow movement as the vessel travels along the surface of the water, b) energy conversion means located in the vessel and responsive to the shock energy induced movement of the bellows means is effective to convert said induced shock energy into useful energy.

20. A vessel as defined in claim 19 wherein said shock energy absorbing means includes pneumatically operated bellows means for compressing air in response to said shock energy.

21. A vessel as defined in claim 19 wherein said shock energy absorbing means includes fluid medium that is the operating material used to run said energy conversion means.

22. A vessel as defined in claim 21 wherein said fluid medium is selected from the group of air and hydraulic liquid.

23. A marine vessel comprising:

a) a topside section for carrying a load, and a hull bottom side section, b) said hull bottom side section including a downwardly directed keel tunnel that longitudinally extends the length of the vessel, and a pivotally mounted bottom shell hull portion disposed across the keel tunnel for changing the hull configuration, c) compressed air tank means is operatively connected to bellows means which is located within said keel tunnel inside said bottom shell hull portion, d) said bellows means being effective to expand and contract and including valve means for moving air into and out of said bellows means as it expands and contracts, and e) activation means for actuating said bellows means and said tank means for moving said pivotally mounted bottom shell hull portion to a desired hull configuration.

24. A vessel as defined in claim 23 wherein said compressed air tank means is located within said keel tunnel.

25. A vessel as defined in claim 23 wherein said bellows means is effective to dampen shock energy resulting from waves pounding against said hull portion, and from recurring striking contact with the water because of the up-and-down vessel bow movement as the vessel travels along the surface of the water.

26. A vessel as defined in claim 25 wherein energy conversion means located in the vessel and responsive to the shock energy induced movement of the bellows means is effective to convert said induced shock energy into useful compressed air or electrical energy.

* * * * *